United States Patent
Cook et al.

(10) Patent No.: US 9,695,598 B2
(45) Date of Patent: *Jul. 4, 2017

(54) SIMULATED LOG SIDING

(71) Applicant: Concrete Log Systems, Inc., Missoula, MT (US)

(72) Inventors: Michael R. Cook, Three Forks, MT (US); Stewart K. Hansen, Missoula, MT (US); Robert L. Whitson, West Bend, WI (US)

(73) Assignee: Concrete Log Systems, Inc., Missoula, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,529

(22) Filed: Apr. 25, 2016

(65) Prior Publication Data

US 2016/0237691 A1 Aug. 18, 2016

Related U.S. Application Data

(63) Continuation of application No. 14/096,252, filed on Dec. 4, 2013, now Pat. No. 9,322,181, which is a continuation of application No. 13/667,132, filed on Nov. 2, 2012, now abandoned, which is a continuation of application No. 12/077,388, filed on Mar. 17, 2008, now Pat. No. 8,302,355.

(60) Provisional application No. 60/918,619, filed on Mar. 15, 2007.

(51) Int. Cl.
| | |
|---|---|
| *E04F 13/00* | (2006.01) |
| *E04B 2/58* | (2006.01) |
| *E04F 13/08* | (2006.01) |
| *B28B 7/00* | (2006.01) |
| *E04F 13/14* | (2006.01) |
| *E04B 2/70* | (2006.01) |
| *E04F 13/16* | (2006.01) |
| *E04F 13/18* | (2006.01) |
| *E04F 13/24* | (2006.01) |

(52) U.S. Cl.
CPC .......... *E04F 13/0873* (2013.01); *B28B 7/007* (2013.01); *E04B 2/708* (2013.01); *E04B 2/709* (2013.01); *E04F 13/08* (2013.01); *E04F 13/0862* (2013.01); *E04F 13/0898* (2013.01); *E04F 13/147* (2013.01); *E04F 13/165* (2013.01); *E04F 13/185* (2013.01); *E04F 13/24* (2013.01)

(58) Field of Classification Search
CPC ........ E04F 13/08; E04F 13/147; E04B 2/709; E04B 2/708; B28B 7/007
See application file for complete search history.

(56) References Cited

U.S. PATENT DOCUMENTS

| | | | |
|---|---|---|---|
| 7,155,866 B2 * | 1/2007 | Bezubic, Jr. ............ | B28B 1/526 52/287.1 |
| 2007/0245667 A1* | 10/2007 | Clegg ..................... | C04B 28/02 52/543 |

* cited by examiner

*Primary Examiner* — Jeanette E Chapman
(74) *Attorney, Agent, or Firm* — Jean Kyle

(57) ABSTRACT

Simulated log siding is formed of an engineered cementitious composite. Single or dual flanges on each log piece is used to apply siding units to a surface. Some siding members are molded into a three dimensional configuration to appear as a structural wood log. Individual end pieces and molded tail clusters when used with the siding provide the appearance of the characteristic stacked or staggered corners of a log structure.

12 Claims, 10 Drawing Sheets

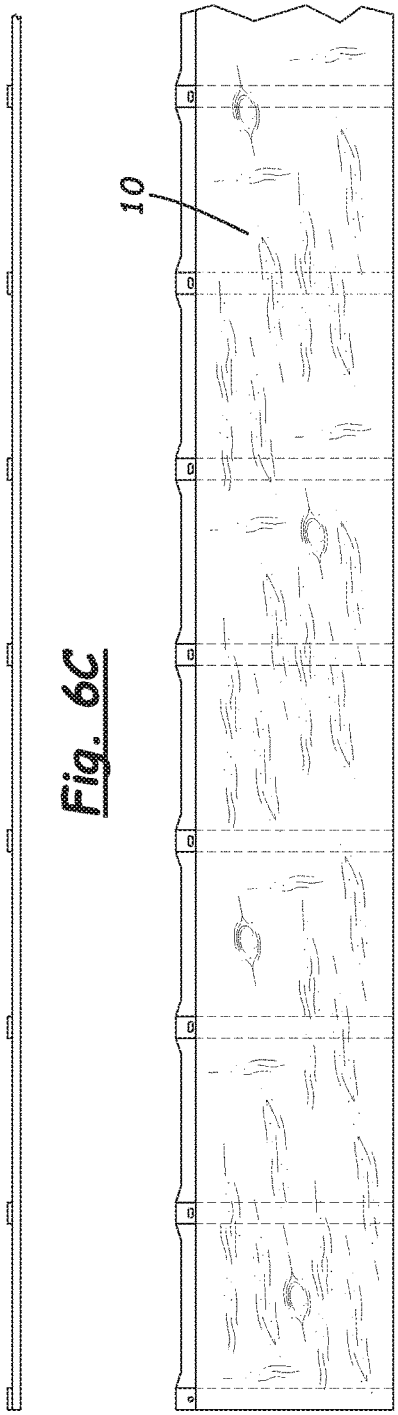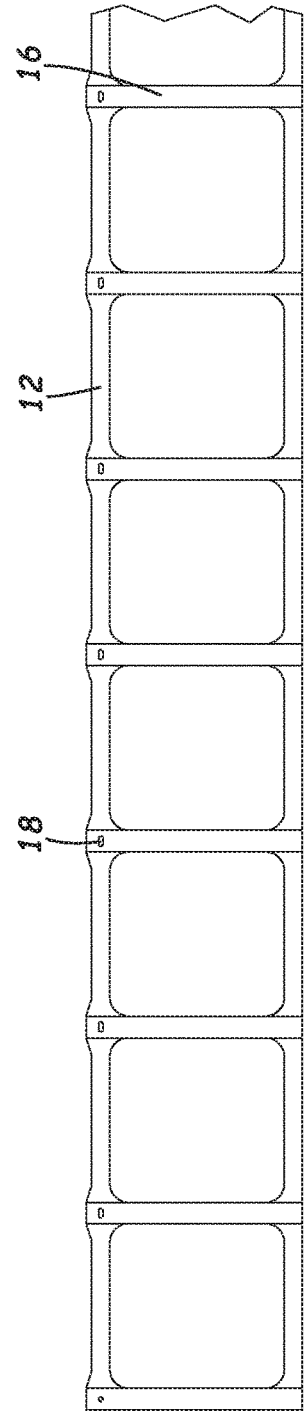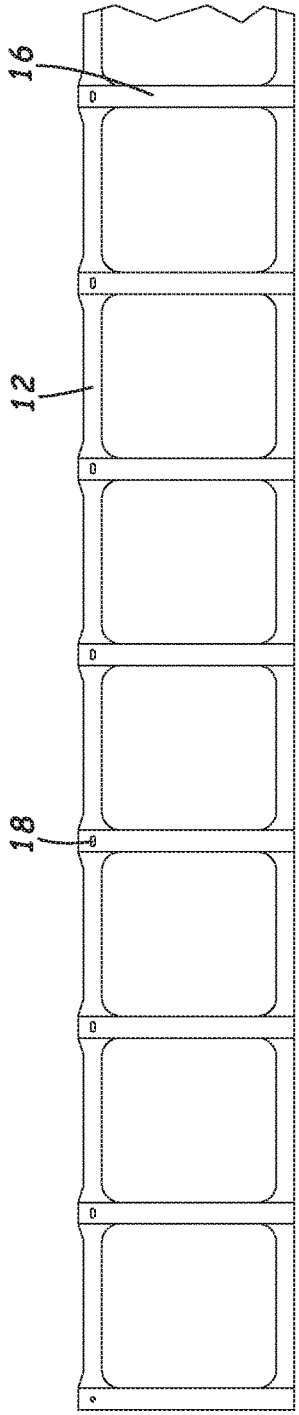

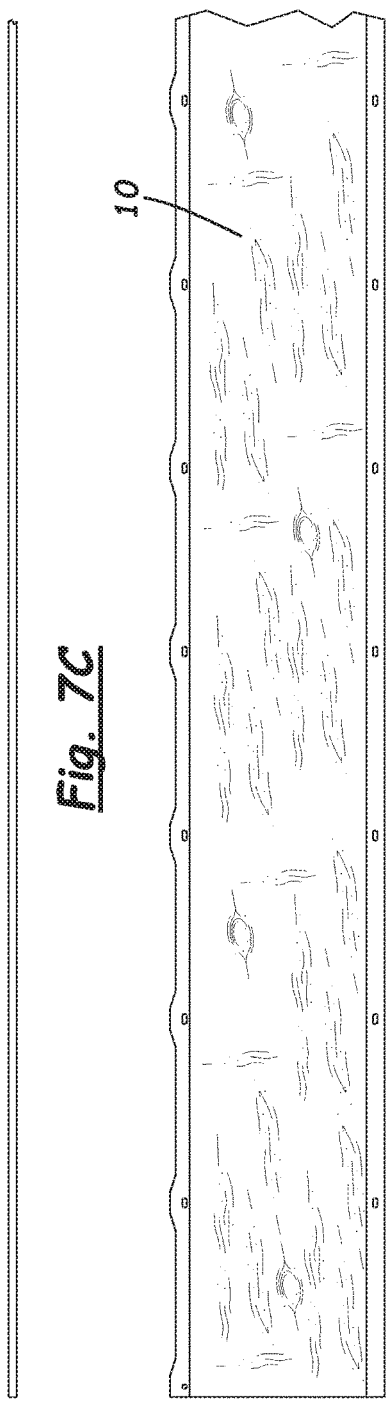
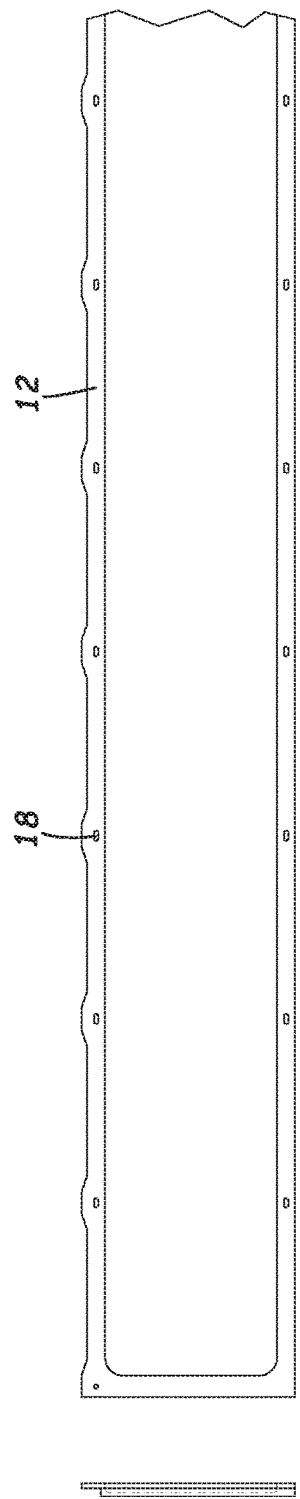
Fig. 7C
Fig. 7A
Fig. 7B
Fig. 7D

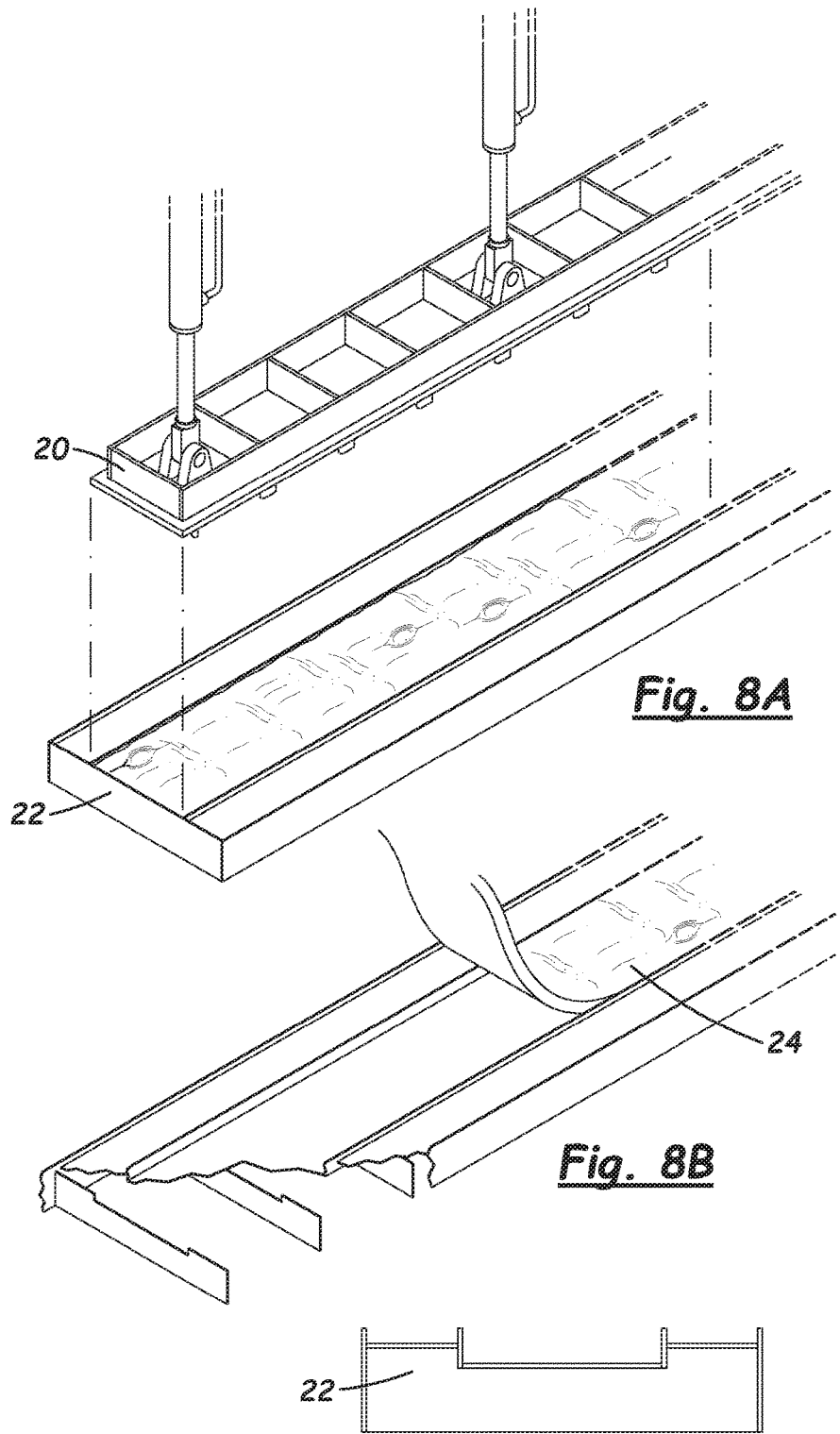

SIMULATED LOG SIDING

CROSS-REFERENCE TO RELATED APPLICATIONS

This application is a continuation of U.S. patent application Ser. No. 14/096,252, filed Dec. 4, 2013, which is a continuation of U.S. patent application Ser. No. 13/667,132, filed Nov. 2, 2012, now abandoned, which is a continuation of U.S. patent application Ser. No. 12/077,388, filed Mar. 17, 2008, now U.S. Pat. No. 8,302,355 B2, issued Nov. 6, 2012, which claims the benefits of U.S. Provisional Application No. 60/918,619, filed Mar. 15, 2007, the disclosures of which are hereby incorporated by reference in their entirety including all figures, tables and drawings.

BACKGROUND OF THE INVENTION

Log buildings are in high demand due to their aesthetic appeal. These structures however can be expensive not only to construct but also to maintain and insure. Log structures are vulnerable to damage from exposure to water, temperature changes, insect infestation and fire damage. Log siding has always been a less expensive alternative for those seeking the log home look, but log sided structures are susceptible to many of the same effects as log structures. Cement siding (U.S. Pat. Nos. 4,288,954 and 7,028,436 B2) and cement logs (U.S. Pat. No. 6,851,233 B2) have been produced to address some of these concerns. These alternatives however are not necessarily appropriate for a do-it-yourselfer (DIY) and often cannot be mass produced. O'Donnell, for example, describes a siding where several layers of cement plaster must be hand-applied to log shaped metal lath on the structure to be sided. The O'Donnell process requires various secondary materials and skilled, on-site, labor.

There remains a need for a simulated log siding that is inexpensive yet conveys a genuine wood log appeal. Ideally, the log-like siding would be resistant to environmental effects, DIY compatible and be fire resistant.

All patents, patent applications, provisional patent applications and publications referred to or cited herein, are incorporated by reference in their entirety to the extent they are not inconsistent with the teachings of the specification.

SUMMARY OF THE INVENTION

The invention involves a siding material cast or formed of an engineered cementitious composite (ECC) that simulates the look of a structural wood log. Open molds, closed molds for injection molding, or an extrusion process are used to create various face surfaces and various end piece surfaces giving the piece the appearance of a structural wood log. Siding pieces are hollow or incorporate a core material to provide a solid piece. Siding pieces, "logs," are applied to a surface by attaching flanges associated with each piece to a structural surface.

The invention also involves cast filler blocks and tail clusters of an ECC to provide a structure covered by the subject siding with a log structure's characteristic woven, stacked or staggered corners. Individual end caps with a log pattern end cut are applied to siding edges to make the log ends appear to be complete log butts. Alternatively, a cast tail cluster of a series of log ends can be attached to the corner of a sided structure.

BRIEF DESCRIPTION OF THE DRAWINGS

FIG. 6A is a face side view of another preferred embodiment of the simulated log siding of the subject invention with reinforcing ribs.

FIG. 6B is a back side view of another preferred embodiment of the simulated log siding of the subject invention with reinforcing ribs.

FIG. 6C is a side elevational view of another preferred embodiment of the simulated log siding of the subject invention with reinforcing ribs.

FIG. 6D is an end view of another preferred embodiment of the simulated log siding of the subject invention with reinforcing ribs.

FIG. 7A is a face side view of another preferred embodiment of the simulated log siding of the subject invention.

FIG. 7B is a back side view of another preferred embodiment of the simulated log siding of the subject invention.

FIG. 7C is a side elevational view of another preferred embodiment of the simulated log siding of the subject invention.

FIG. 7D is an end view of another preferred embodiment of the simulated log siding of the subject invention.

FIGS. 8A-C are environmental views of a preferred manufacturing process of the log siding of the subject invention.

DETAILED DESCRIPTION OF THE INVENTION

Figure 3:
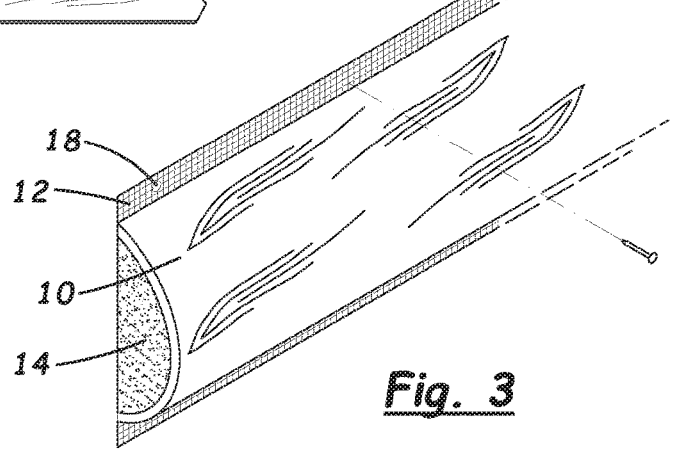
FIG. 3 is a perspective view of a front side of a preferred embodiment of a siding piece of the subject invention.
Figure 4A:
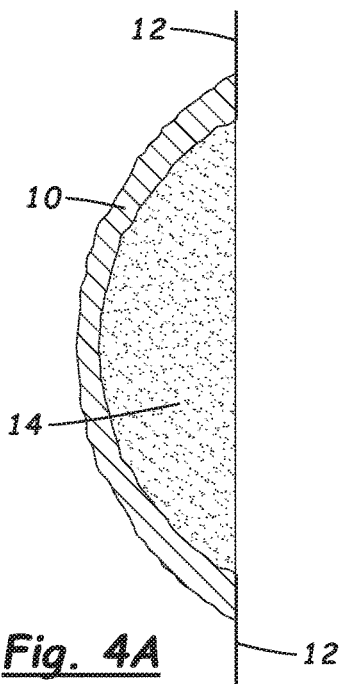
FIG. 4A is a cross-sectional view of a preferred embodiment of a siding piece of the subject invention having a simulated peeled log appearance and a foam core.
Figure 4B:
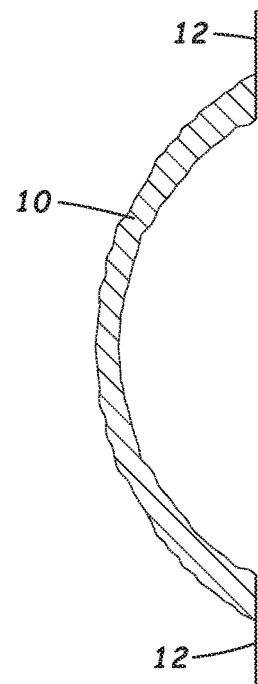
FIG. 4B is a cross-sectional view of a preferred embodiment of a siding piece of the subject invention having a simulated peeled log appearance.
Figure 5A:
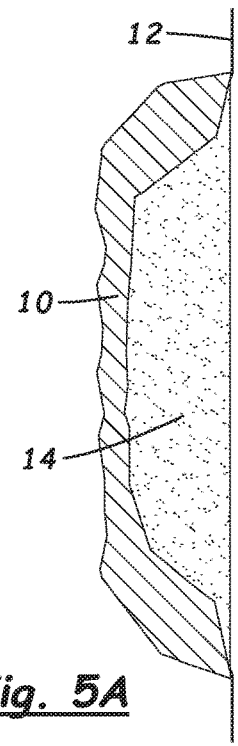
FIG. 5A is a cross-sectional view of a preferred embodiment of a siding piece of the subject invention having a simulated hand hewn log appearance and a foam core.
Figure 5B:
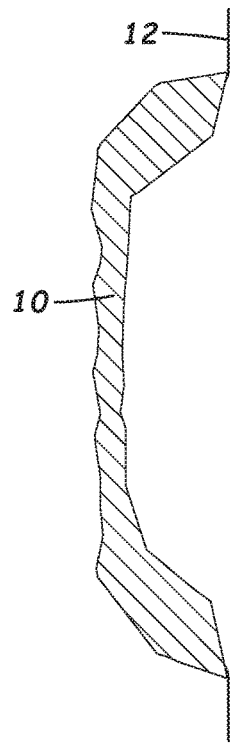
FIG. 5B is a cross-sectional view of a preferred embodiment of a siding piece of the subject invention having a simulated hand hewn log appearance.

The simulated wood log siding of the subject invention comprises log shaped pieces (FIG. 3). Each piece is about the length of a structural wood log, for example, from about eight feet to about twelve feet. Engineered cementitious composite is cast or sprayed in a mold taken from a structural wood log. The molds 24 can be taken from any type of log including peeled (FIG. 4), partially peeled, and hand hewn (FIG. 5) logs and the mold preferably includes details of the butt end portion of the log. In some embodiments, urethane foam is blown into the cast mold to form a solid log shape.

The siding pieces 10 of the subject invention are preferably the length of a structural log, about eight to twelve feet, to provide an authentic log structure appearance. Pieces are cast or formed in flexible open molds, flexible closed molds by injection molding, or by an extrusion process as a sheath or solid body. In a preferred embodiment, the pieces are cast of an engineered cementitious composite (ECC). One skilled in the art is able to identify and formulate suitable ECCs to provide the flexural strength required for the length of each the siding pieces. A foam, wire or solid core can also be incorporated into the siding piece to provide flexural strength. One skilled in the art would likewise be able to identify and formulate suitable materials for casting siding pieces that are shorter or for filler blocks and tail clusters.

Fastening flanges 12 can assist in fastening the subject siding to a wall. Fastening flanges 12 along the long edges of each "log" 10 are embedded in the ECC material or are formed by the ECC material. In a preferred embodiment, the flange is a material embedded in the material. A hinge on the mold support can cover the flange material to prevent if from being fowled with ECC and foam. Flange material useful in the subject invention can be anything strong enough to support the siding piece and secure it to the structure. Suitable flange material includes, but is not limited to, metal hardware cloth, metal lath, black UV poly deer fence netting and sunblocker POLYMAX black knitted shade material. Alternatively, the flange can include special brackets or tabs to attach the siding to the structure. The chosen flange material dictates the attachment schedule to attach the siding to a wall.

Figure 9A:
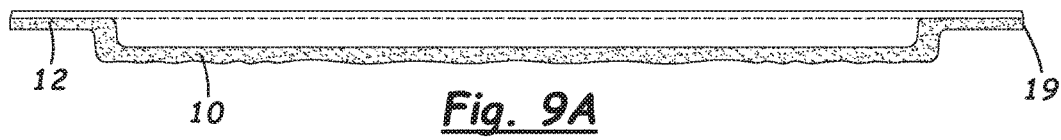
FIG. 9A is a cross-sectional view of a siding piece of the embodiment shown in FIG. 6.
Figure 9B:
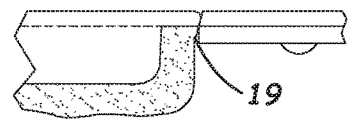
FIG. 9B is a cross-sectional view of a siding piece of the embodiment shown in FIG. 6 on a structure in relation to other like siding pieces.

In another preferred embodiment, one or duo the attachment flanges 12 are formed while casting or forming the piece. The flange is molded onto the "log" (see, for example, FIG. 9). In a preferred embodiment, reinforcing ribs 16 preferably span the width of the log for support. The ribs are most preferably 16 inches on center and provide a small space behind the siding piece to protect the wall from trapped moisture. Fastening pilots 18 are spaced along the flange through which a fastener can be placed to secure the piece to the structure (FIG. 6). Preferably, flange edges 19 (FIG. 9B) are beveled. The bevel allows one siding piece to engage the flanges of other siding pieces above and below it on the wall.

An advantage of the subject siding is that it can be mass produced. One means by which the subject siding can be mass produced is shown in FIG. 8 where a single male mold 20 can be used while multiple female molds 22 pass on a conveyor (not shown). The female molds move to a curing station after casting. The expected dwell time to cast a 12 foot long piece is about 15 seconds.

Siding pieces are applied to the wall to simulate a log structure. Fasteners to secure the siding to the wall are chosen as appropriate for the wall substrate. Gaps left between the secured "logs" can be filled with chinking to complete the illusion of an authentic log cabin.

Figure 10:
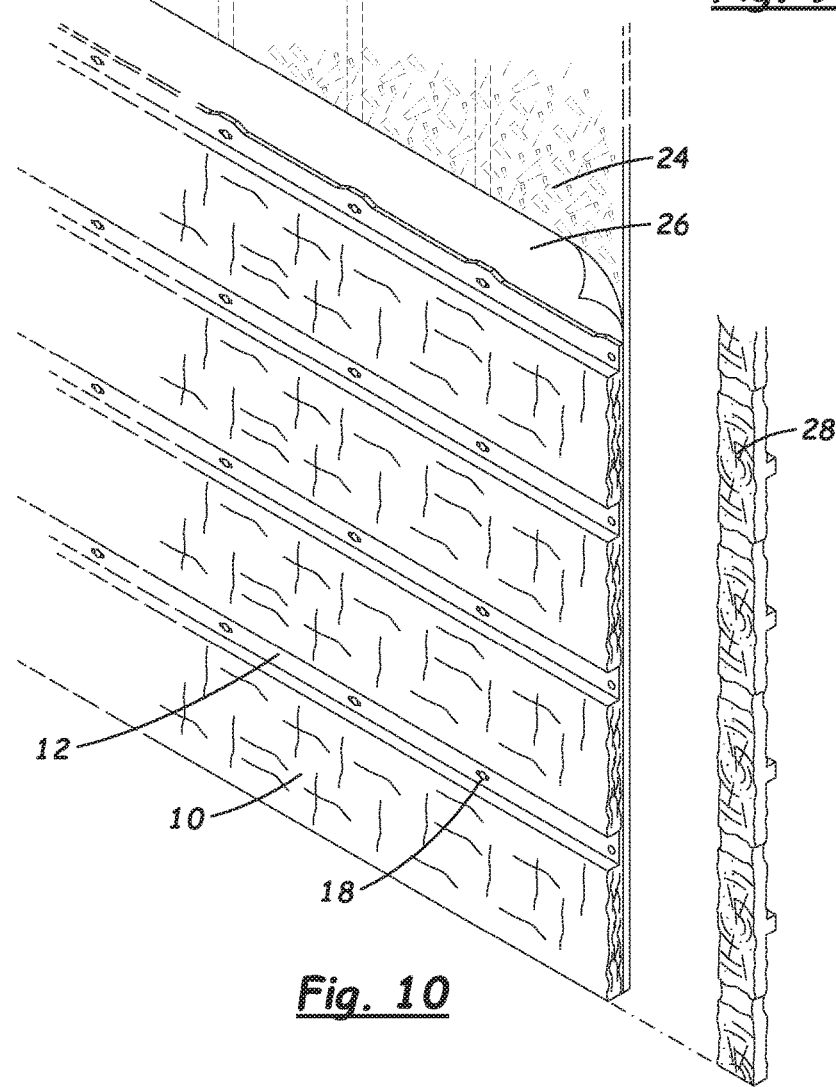
FIG. 10 is a perspective view of the embodiment shown in FIG. 6 on a structure exploded at the seam to show the vertical joint piece.
Figure 11:
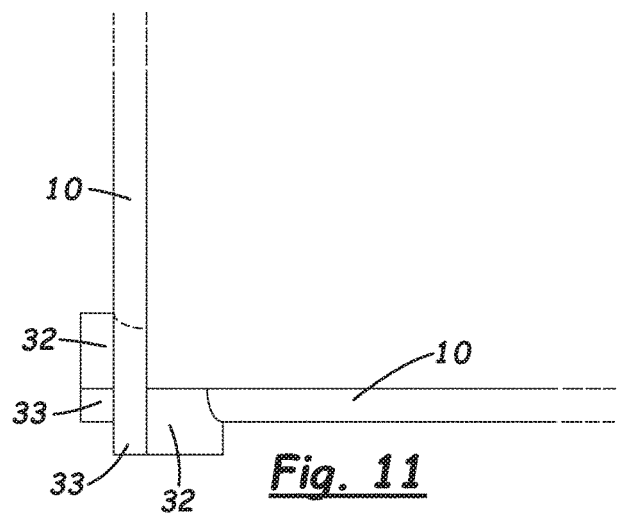
FIG. 11 is a top plan view of a staggered-style corner of a structure sided with the siding of the subject invention using filler blocks.
Figure 12A:
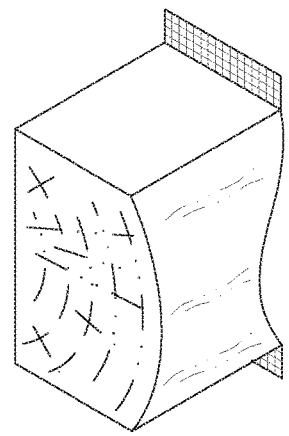
FIG. 12A is a perspective front left side view of a preferred embodiment of a filler block of the subject invention.
Figure 12B:
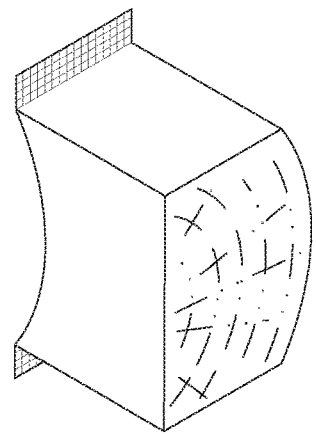
FIG. 12B is a perspective front right side view of a preferred embodiment of a filler block of the subject invention.
Figure 12C:
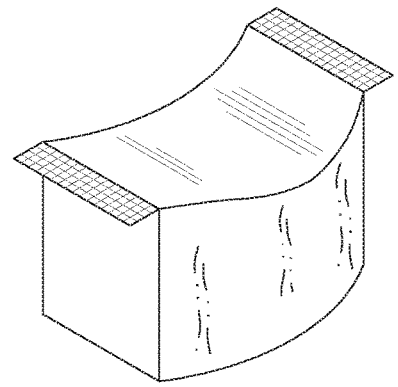
FIG. 12C is a perspective rear view of a preferred embodiment of a filler block of the subject invention.

Siding pieces are installed over the structure's sheathing 24 and over a vapor barrier 26. When a wall being covered is longer than the length of the siding piece, for example, greater than 12 feet, a vertical joint piece 28 can be inserted at the butt joint (FIG. 10). Alternatively, the log surface molds 20 are designed so that the log surface pattern near the end of each "log" coordinates and matches with the surface pattern of an adjacent log mold so that when pieces are butted they appear to be a continuous piece.

Figure 1:
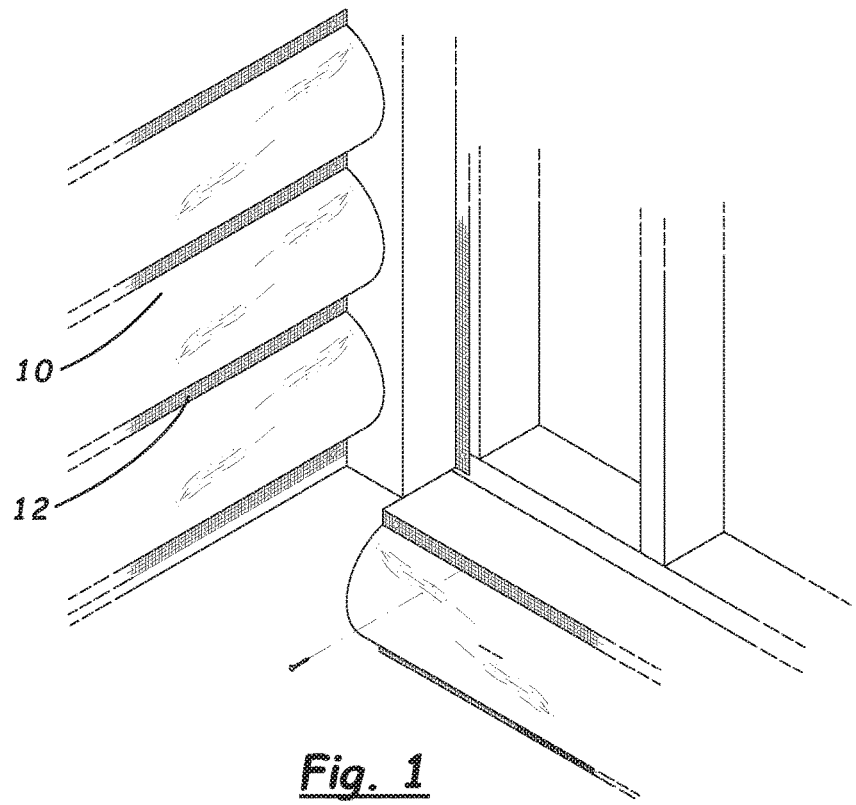
FIG. 1 is a perspective view of a preferred embodiment of an inside corner of a structure sided with the simulated log siding of the subject invention.
Figure 2:
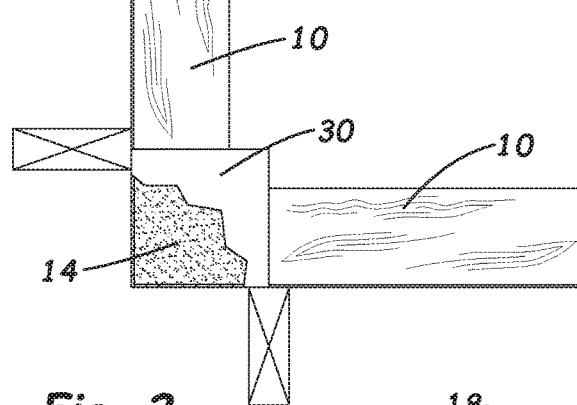
FIG. 2 is a top plan view of the corner shown in FIG. 1.
Figure 19A:
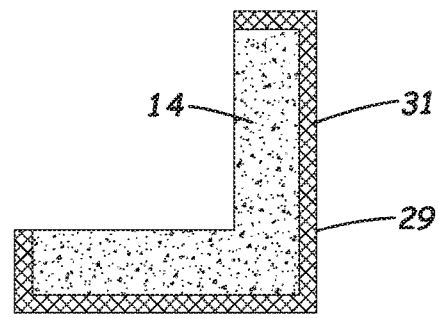
FIG. 19A is a top plan cross-sectional vie of a preferred embodiment of an exterior corner piece.
Figure 19B:
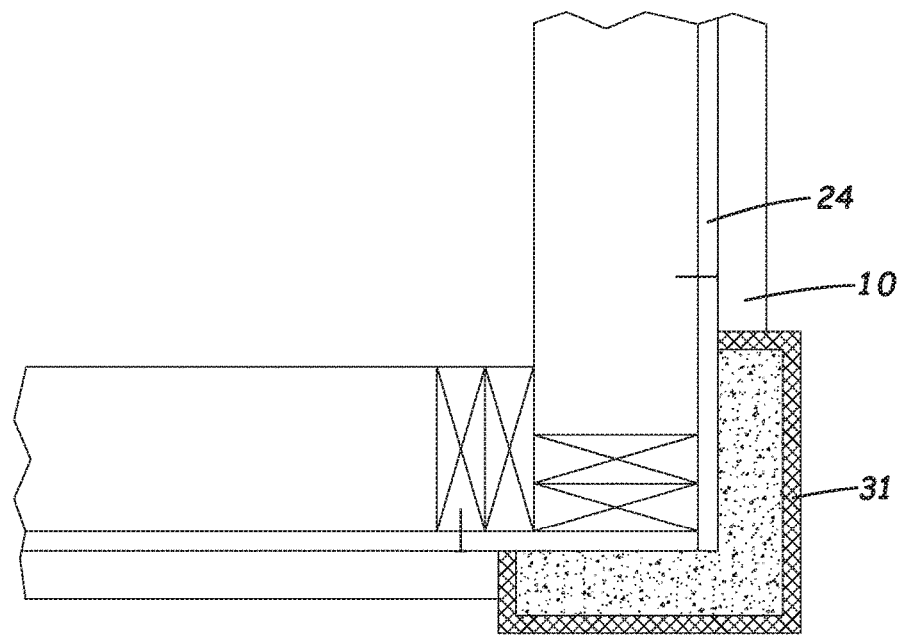
FIG. 19B is a top plan cross-sectional vie of a preferred embodiment of an exterior corner piece attached to a structure sided with the siding of the subject invention.

The exterior corners of a structure sided with the simulated wood log siding of the subject invention can be finished in a number of ways. The exterior corners can be capped by a corner post. A square corner post (FIG. 19) is shown however a round corner post can also be used. The corner post 31 has a foam core 14 covered by ECC resembling a wooden post 29. Interior corners likewise can be finished in a corner post 30 (FIGS. 1 and 2). Alternatively, the ends of each siding piece can be mitered to join one another and form a corner both on interior and exterior corners.

Figure 13:
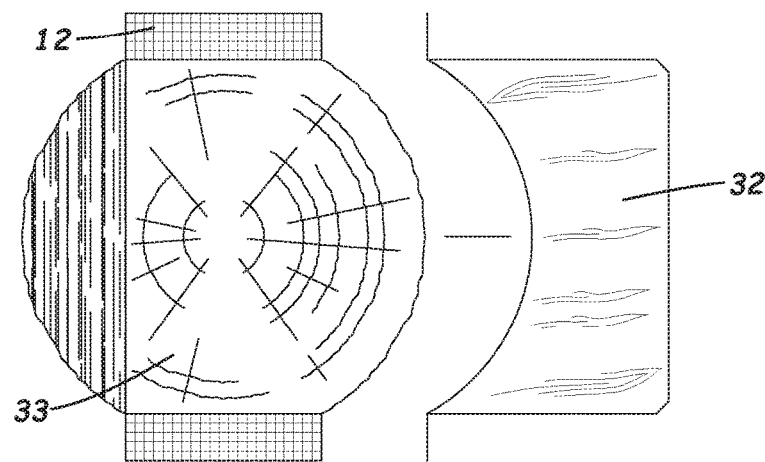
FIG. 13 is an exploded side view of a staggered-style corner where the filler block completes the half log siding.
Figure 14:
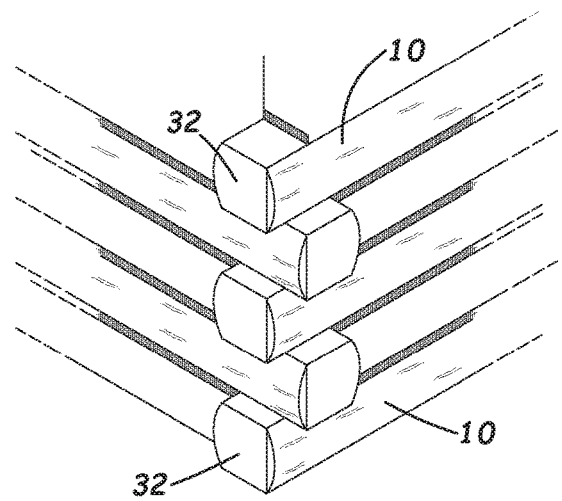
FIG. 14 is a perspective view of an outside corner using filler blocks in a staggered-style corner joint.
Figure 15:
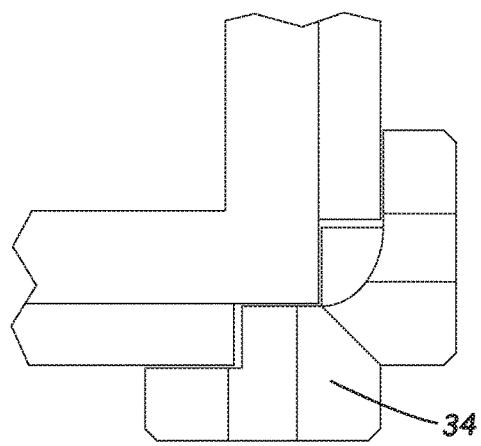
FIG. 15 is a top plan view of an outside corner with a preferred embodiment of a tail cluster in place.
Figure 16:
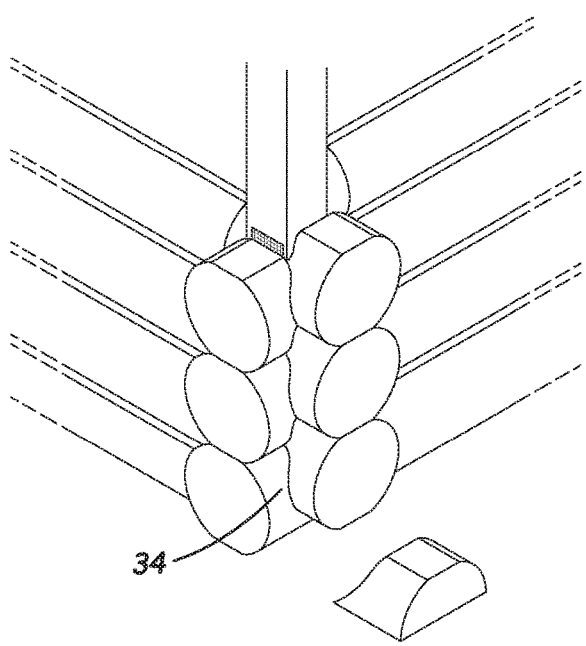
FIG. 16 is a perspective view of the corner shown in FIG. 15.
Figure 17:
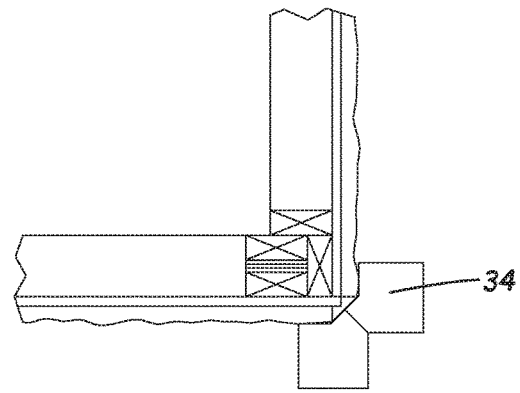
FIG. 17 is a top cross-sectional view of a corner sided with the siding of the subject invention.
Figure 18:
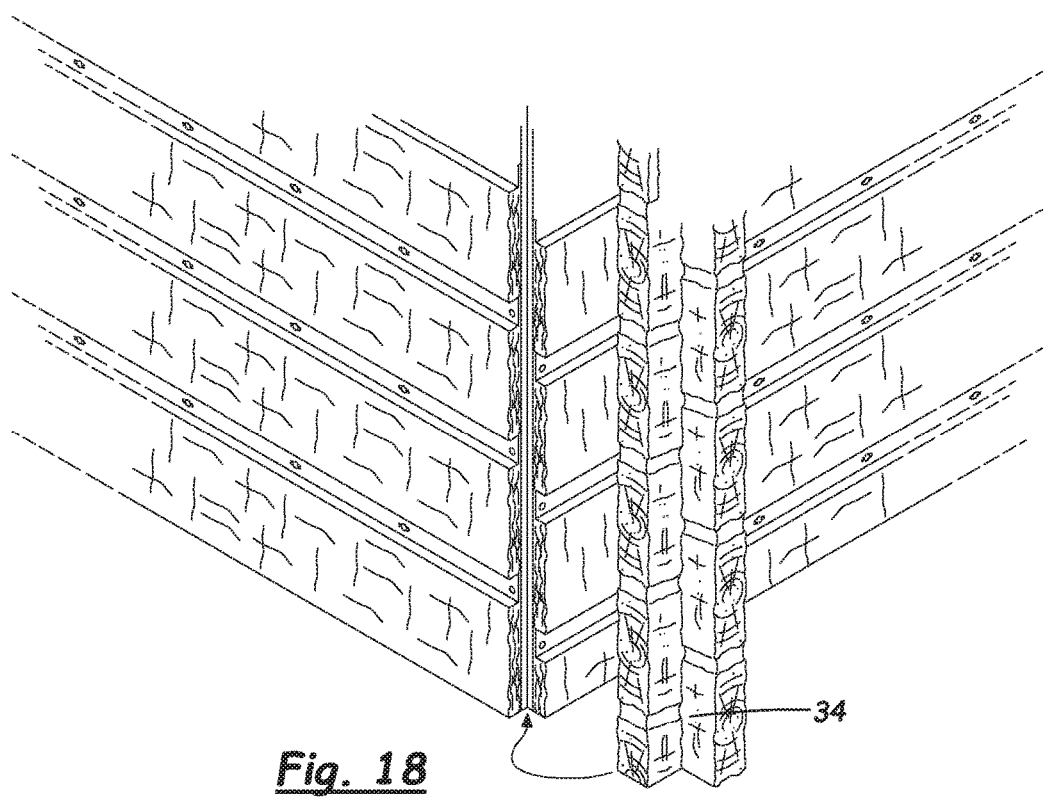
FIG. 18 is an exploded perspective view of the corner shown in FIG. 17.

A more traditional stacked or staggered look on external or exterior corners can be achieved on a structure sided with the simulated wood log siding of the subject invention by using end filler blocks or cast tail clusters. Filler blocks 32 can be used to achieve a stacked look (FIGS. 11-14). As noted previously, molds preferably include details of the butt end portion of the log 33. The blocks complete these siding pieces that extend past the corner of the structure to provide a look of a complete, as opposed to a half, log end (FIG. 13). Filler end blocks for a staggered corner that give the appearance the logs are notched when stacked. Siding pieces are notched and filler end blocks are inserted at the joint to complete the log end. FIGS. 15-18 show cast tail clusters 34 to be applied to an unfinished exterior corner of a structure sided with the simulated log siding of the subject invention. Each cluster is a plurality of molded log butt ends stacked to appear to be a staggered log corner. The cluster is aligned with the siding pieces to give the appearance of a series of continuous stacked logs. The clusters can be attached to the sided structure with a flange or straps.

The simulated log siding of the subject invention is an economical and realistic solution to an increasing market for authentic log-like structures. The siding can be mass produced and can be applied to new construction or be presented as an option during re-siding. The subject siding is easy to install and can be applied by a do-it-yourselfer. The siding provides an authentic log profile with wood aesthetics and offers traditional log structure details.

It is understood that the foregoing examples are merely illustrative of the present invention. Certain modifications of the articles and/or methods may be made and still achieve the objectives of the invention. Such modifications are contemplated as within the scope of the claimed invention.

The invention claimed is:

1. A molded horizontally elongated siding member for use on a structure to simulate log construction, the siding member comprising:
    a first edge and a second edge, the member comprising an exterior convex surface and an interior concave surface between the first edge and the second edge;
    a first end and a second end defining a length of the member;
    the exterior convex surface cast in a reverse mold of a structural log to replicate the texture of a structural log; and
    at least one flange along at least one of the edges to attach the member to the structure; wherein the siding member is cast of engineered cementitious composite and is an open trough and wherein the siding member contacts the structure at least along one of the first edge, the second edge, and the at least one flange.

2. The siding member of claim 1, wherein said length of said siding member is from about eight feet to about twelve feet.

3. The siding member of claim 1, wherein said exterior convex surface is cast to replicate the texture of a peeled log.

4. The siding member of claim 1, wherein said exterior convex surface is cast to replicate the texture of a partially peeled log.

5. The siding member of claim 1, wherein said exterior convex surface is cast to replicate the texture of a hand-hewn log.

6. The siding member of claim 1, further comprising a non-supporting foam core inserted into said reverse mold after said engineered cementitious composite is in said mold.

7. The siding member of claim 1, wherein said at least one flange is embedded in said siding member.

8. The siding member of claim 7, wherein said flange is formed from a material selected from the group consisting of metal hardware cloth, metal lath and a synthetic knitted material.

9. The siding member of claim 1, wherein said at least one flange is integral to and an extension of the siding member and is formed from the engineered cementitious composite material.

10. The siding member of claim 1, wherein said at least one of said ends is formed to resemble a portion of the butt end of a structural log.

11. The siding member of claim 10, wherein said siding member further comprises a filler block resembling the remainder of the butt end of the structural log.

12. The siding member of claim 1, wherein when at least one of said first end or said second end contacts at least one of a first end or a second end of another like siding member at a butt joint, the texture to replicate a structural log on said exterior convex surface of said siding member matches texture to replicate a structural log on an exterior convex surface of the another like siding member so the texture spans the joint.

* * * * *

EX PARTE REEXAMINATION CERTIFICATE (11527th)

United States Patent
Cook et al.

(10) Number: US 9,695,598 C1
(45) Certificate Issued: *Jun. 10, 2019

(54) SIMULATED LOG SIDING

(71) Applicant: Concrete Log Systems, Inc., Missoula, MT (US)

(72) Inventors: Michael R. Cook, Three Forks, MT (US); Stewart K. Hansen, Missoula, MT (US); Robert L. Whitson, West Bend, WI (US)

(73) Assignee: CONCRETE LOG SYSTEMS INC., Missoula, MT (US)

Reexamination Request:
No. 90/014,125, Apr. 18, 2018

Reexamination Certificate for:
Patent No.: 9,695,598
Issued: Jul. 4, 2017
Appl. No.: 15/137,529
Filed: Apr. 25, 2016

(*) Notice: This patent is subject to a terminal disclaimer.

Related U.S. Application Data

(63) Continuation of application No. 14/096,252, filed on Dec. 4, 2013, now Pat. No. 9,322,181, which is a continuation of application No. 13/667,132, filed on Nov. 2, 2012, now abandoned, which is a continuation of application No. 12/077,388, filed on Mar. 17, 2008, now Pat. No. 8,302,355.

(60) Provisional application No. 60/918,619, filed on Mar. 15, 2007.

(51) Int. Cl.
E04F 13/08 (2006.01)
B28B 7/00 (2006.01)
E04F 13/14 (2006.01)
E04B 2/70 (2006.01)
E04F 13/24 (2006.01)
E04F 13/16 (2006.01)
E04F 13/18 (2006.01)
E04F 13/00 (2006.01)
E04B 2/58 (2006.01)

(52) U.S. Cl.
CPC .......... E04F 13/0873 (2013.01); B28B 7/007 (2013.01); E04B 2/708 (2013.01); E04B 2/709 (2013.01); E04F 13/08 (2013.01); E04F 13/0862 (2013.01); E04F 13/0898 (2013.01); E04F 13/147 (2013.01); E04F 13/165 (2013.01); E04F 13/185 (2013.01); E04F 13/24 (2013.01); Y02A 30/336 (2018.01)

(58) Field of Classification Search
None
See application file for complete search history.

(56) References Cited

To view the complete listing of prior art documents cited during the proceeding for Reexamination Control Number 90/014,125, please refer to the USPTO's public Patent Application Information Retrieval (PAIR) system under the Display References tab.

*Primary Examiner* — William C Doerrler

(57) ABSTRACT

Simulated log siding is formed of an engineered cementitious composite. Single or dual flanges on each log piece is used to apply siding units to a surface. Some siding members are molded into a three dimensional configuration to appear as a structural wood log. Individual end pieces and molded tail clusters when used with the siding provide the appearance of the characteristic stacked or staggered corners of a log structure.

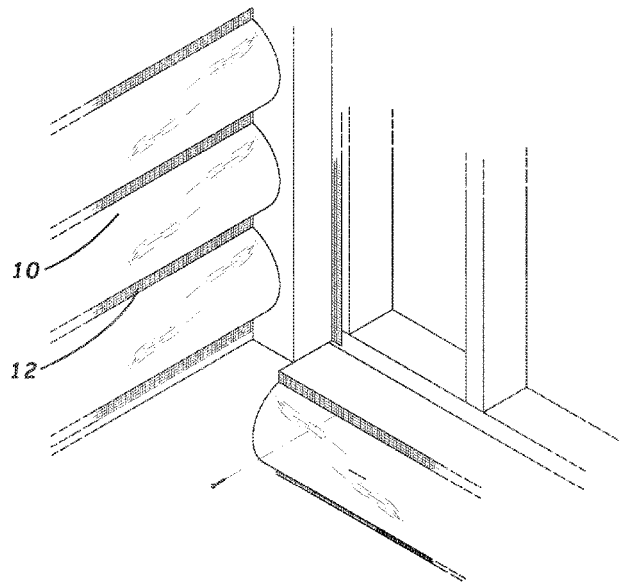
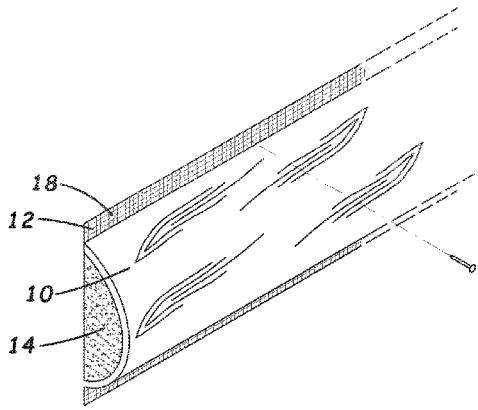

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-12 is confirmed.

\* \* \* \* \*